Sept. 18, 1962 P. C. THONEMANN ETAL 3,054,742
GAS DISCHARGE APPARATUS
Filed Oct. 25, 1957 8 Sheets-Sheet 1

PETER CLIVE THONEMANN
ROBERT CARRUTHERS
ROY JOHN BICKERTON
Inventors

Attorneys

PETER CLIVE THONEMANN
ROBERT CARRUTHERS
ROY JOHN BICKERTON
Inventors

Attorneys

PETER CLIVE THONEMANN
ROBERT CARRUTHERS
ROY JOHN BICKERTON
Inventors

Attorneys

Sept. 18, 1962  P. C. THONEMANN ETAL  3,054,742
GAS DISCHARGE APPARATUS
Filed Oct. 25, 1957  8 Sheets-Sheet 6

PETER CLIVE THONEMANN
ROBERT CARRUTHERS
ROY JOHN BICKERTON
Inventors

Attorneys

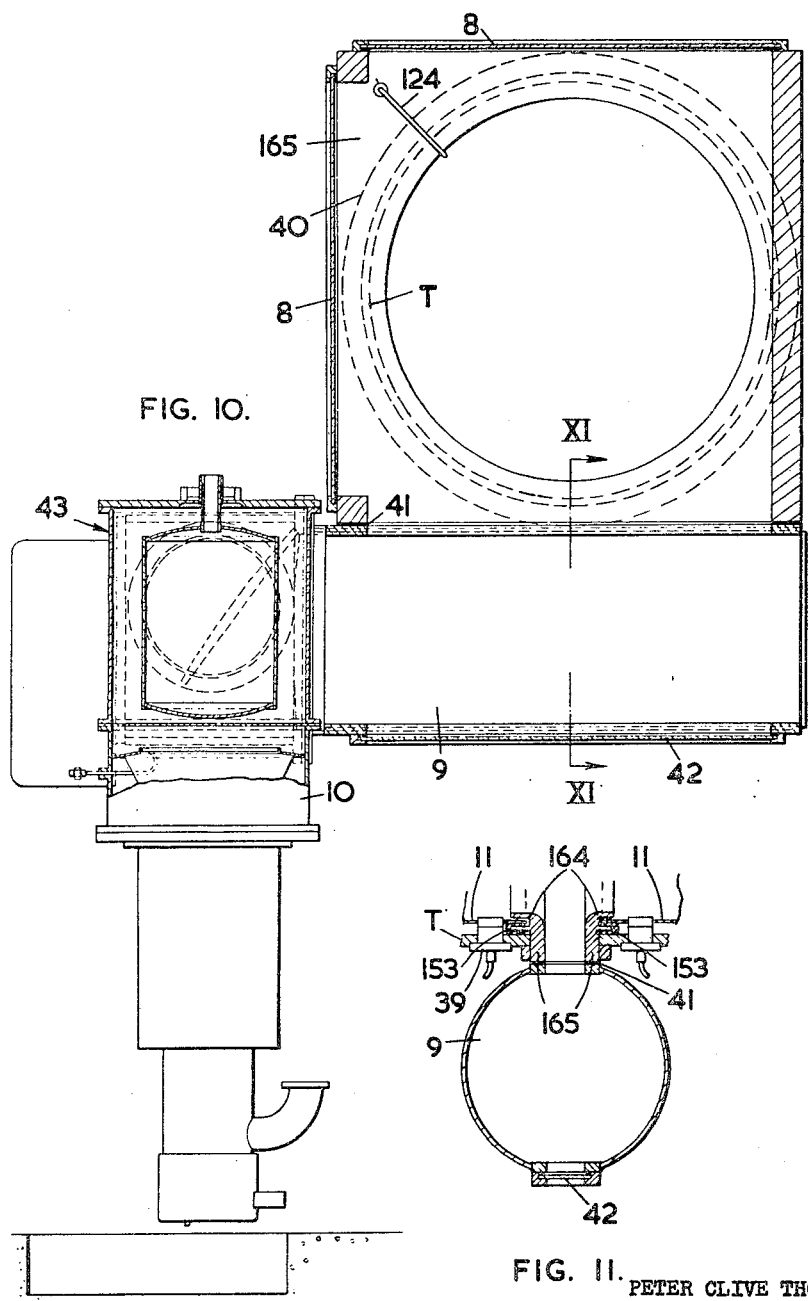

PETER CLIVE THONEMANN
ROBERT CARRUTHERS
ROY JOHN BICKERTON
Inventors

Attorneys

United States Patent Office 3,054,742
Patented Sept. 18, 1962

3,054,742
GAS DISCHARGE APPARATUS
Peter Clive Thonemann, Cumnor, Oxford, Robert Carruthers, Abingdon, and Roy John Bickerton, Cumnor, Oxford, England, assignors to The United Kingdom Atomic Energy Authority, Patents Branch, London, England
Filed Oct. 25, 1957, Ser. No. 692,500
Claims priority, application Great Britain Oct. 26, 1956
11 Claims. (Cl. 204—193.2)

This invention relates to gas discharge apparatus suitable for research into the production of controlled thermonuclear fusion reactions.

For the initiation of nuclear reactions in light elements, particularly for the production of neutrons, effort has hitherto been primarily directed to bombarding targets of or containing deuterium compounds or light elements with protons, deuterons or helium nuclei accelerated to a sufficient degree to attain conditions for the nuclear reactions. In the specification of co-pending U.S. application Serial No. 692,499, filed October 25, 1957, which is a continuation-in-part of application Serial No. 623,709, filed November 21, 1956, and now abandoned, means are described for accelerating nuclei in such a way that they interact between themselves to a significant degree whereby their energy is not lost in bombardment of a relatively massive target, nor is released nuclear energy lost in the target; on the contrary energy released by nuclear reaction becomes available in the body of nuclei to maintain their energy and to compensate for losses by radiation.

The major requirements which arise, and which are set forth in said specification, are, firstly, to contain the nuclei for a substantial time without allowing them to collide with any containing walls; and secondly, to increase the energy of the contained nuclei by frequent collisions in such a way that they have a random distribution of velocity, i.e. energy must be imparted to them in a way to increase the temperature of the gas and not merely to accelerate the nuclei in parallel paths to constitute a beam of fast ions.

Satisfaction of the first requirement involves providing for the localising of gas particles without interposing material barriers in the path of the gas particles. In general the particles of a gas, by reason of their thermal motion, tend to collide with the walls of its containing vessel. Hence means other than material containing walls are required for exerting a localising effect upon the gas.

According to the present invention gas discharge apparatus comprises a toroidal vessel for containing the gas, said vessel having thick electrically conducting walls with at least one electrically insulating joint transverse to the continuous axis of the vessel, pulse transformer means coupled to said vessel for establishing a pinched high-current undirectional pulsed ring discharge in the gas, and means including a toroidal winding on the outside of the vessel for setting up a magnetic field within the vessel parallel to the discharge channel.

The vessel may be provided with a toroidal liner arranged within and adjacent the wall of said vessel to shield the insulating joint from the discharge. The liner may comprise of plurality of metallic substantially cylindrical segments insulated from the vessel and from one another.

The pulse transformer means may comprise at least one ring transformer core linking the vessel and the primary winding of the transformer may be a winding on the core. The transformer may have a direct current bias winding.

The transformer primary winding may be energised by a circuit comprising a condenser chargeable from a voltage source and dischargeable through the winding. The condenser may be dischargeable through a switch in series with a saturable reactor, which reactor may be shunted by a resistor to enable the gas to be preheated before the pulse is applied.

Radio-frequency energy may be injected into the vessel prior to the application of the main pulse to promote ionisation. The radio-frequency energy may be injected into the vessel between two of the aforementioned liner segments.

The primary winding should produce a minimum stray field within the toroidal vessel or torus, and hence be either a winding uniformly distributed over the surface of the torus or, as in a preferred embodiment, a distributed toroidal winding on the core.

In this preferred embodiment two ring cores are provided at opposite ends of a diameter of the torus, bias windings being provided on these cores so that the current pulse can produce a maximum swing in flux density for a given core area. The torus has a thick metal wall with two transverse insulated joints, one at each end of the said diameter, and contains a plurality of overlapping cylindrical metal liner segments coaxial with the torus which serve to shield the two joints from ion bombardment and ultra-violet radiation which would otherwise result in breakdown of the insulation of the joints under operation conditions. The constricted high-current ring discharge is set up substantially along the axis of the torus in consequence of gas in the torus forming a short-circuited secondary winding of a pulse transformer comprising the two cores. A conducting path is initiated by injecting a small amount of R.F. power into the torus immediately prior to the commencement of each pulse. Thus power from an external source is applied in the form of pulses, the current loop is established only during the period of each pulse, and fusion reactions can take place only during these periods. The bore diameter of the torus is about 1 metre and the amplitude and duration of the primary current pulse are such as induce a secondary peak gas current of at least 100 kiloamperes at a gas pressure in the range $10^{-3}$ to $10^{-4}$ mm. Hg for at least 1 millisecond. Provision is made for continuously or intermittently withdrawing used gas and for introducing fresh gas into the torus.

The invention operates to establish by means of the self magnetic and electric fields of the ring discharge a particle density gradient falling in all directions normal to the circular or other endless axis of the discharge so that the gas is largely contained by the field and collisions with the walls of the containing vessel are substantially reduced.

The ring discharge current consists of a stream of circulating electrons. An electron attaining, as the result of a collision with an ion, a radial component of velocity with respect to the main electron stream is deflected by the magnetic lines of force encircling the stream to follow a helical path in the general direction of the main stream.

The positive ions or nuclei of the gas are bound to the electron stream by electrostatic attraction. Displacement of positive ions from the electron stream leaves a space-charge, the effect of which is to limit such movement.

Since the nuclei are thus largely contained by the self magnetic and electric fields of the ring current and only few suffer loss of energy by collisions with the walls of the vessel as is hereinafter explained, the energy can be continuously increased over a substantial period of time.

The second requirement, namely increasing the energy of the nuclei of the ionised gas, is met partly by collisions with circulating electrons derived from the act of ionisation and afterwards themselves accelerated by applied electromagnetic fields so that they constitute the closed current loop described above, and partly by a random kinetic motion of the ions resulting from restoring forces due to image currents induced in the walls of the vessel containing the current loop when the loop approaches the walls.

The collision of high energy electrons with the positive ions leads to a transfer of energy from the electrons to the ions, and since the energy of the electrons is derived from an external source, the external source is used indirectly to raise the ions to a high kinetic energy. Hence while the device is being started the energy of the nuclei is all derived directly or indirectly from the external source or sources of power which create and maintain the current loop.

The heating effect of the image currents induced in the walls of the containing vessel, may be explained as follows. It is found that the path of the current loop, to which the gaseous ions are bound, can be stabilised, so that the loop does not touch the walls of the containing vessel, by making the walls sufficiently thick and highly conducting. The wall thickness must be large compared with the skin depth of the eddy currents induced therein by the discharge at the lowest frequency encountered. Under these conditions, the loop in approaching the wall induces eddy currents in the wall which oppose the motion of the loop and prevent it touching the wall. Moreover as the current channel approaches the wall, the magnetic lines of force surrounding the channel become distorted as the channel is retarded. The retarding force only acts on the outer region of the ionised gas (owing to skin effect) so that the central region tends to become more dense on that side of the channel nearest to the wall. The motion of the interior ions into the high density region leads to collisions and thus to the production of random ion motion of high mean energy. As the channel moves away from the wall, oscillations in the ionised gas resulting from its impact (through the magnetic fields) with the wall lead to a further increase in the random energy of the ions.

Also in the preferred embodiment provision is made for applying a stabilising magnetic field for the discharge by means of a toroidal winding on the vessel through which winding a D.C. current is passed.

The effect of the stabilising winding is to provide an axial magnetic field which tends to be trapped by the ionised gases so that any perturbations which may develop in the discharge path cause a "stretching" of the lines of force of the field and produce a restoring force tending to prevent the development of the perturbations. Further, due to the non-isotropic electrical conductivity of the ionised gas, the discharge current no longer flows in the same direction as the axial electric field and the current stream lines tend to form a helix about the discharge axis. This helical configuration of current flow generates an additional axial magnetic field. Thus as a result of this phenomenon a comparatively weak magnetic field, generated from an external source, can be used to reduce the instability to an acceptable level.

The preferred embodiment of the present invention will now be described by way of example with reference to the accompanying drawings, wherein:

FIG. 10 is a section on the line X—X of FIG. 2 showing details of the viewing windows, pumping manifold and pumps.

FIG. 11 is a fragmentary section on the line XI—XI of FIG. 10, and

Figure 1:
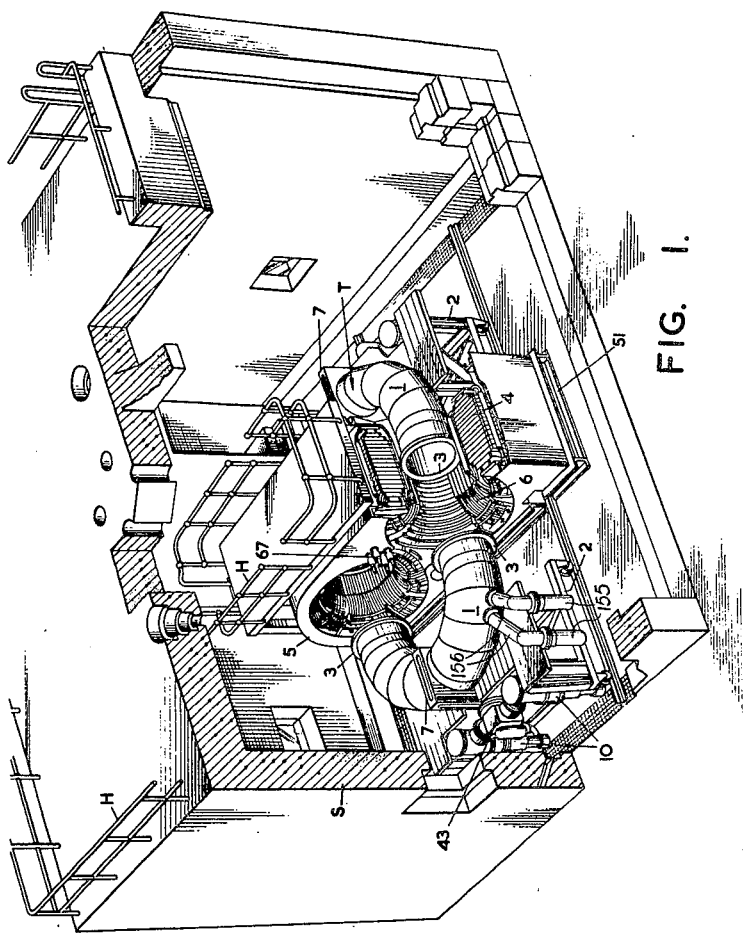
FIG. 1 is a general perspective view of the apparatus with parts of the enclosing walls broken away and a part of the apparatus (one half of the torus) displaced for access purposes.
Figure 2:
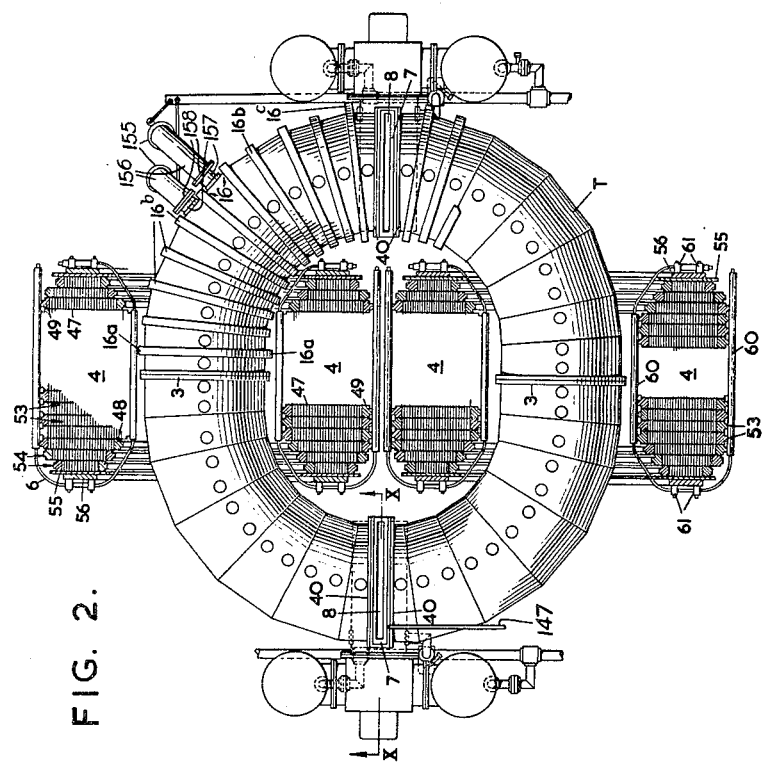
FIG. 2 is a plan view of the torus, showing the transformer cores in section.
Figure 3:
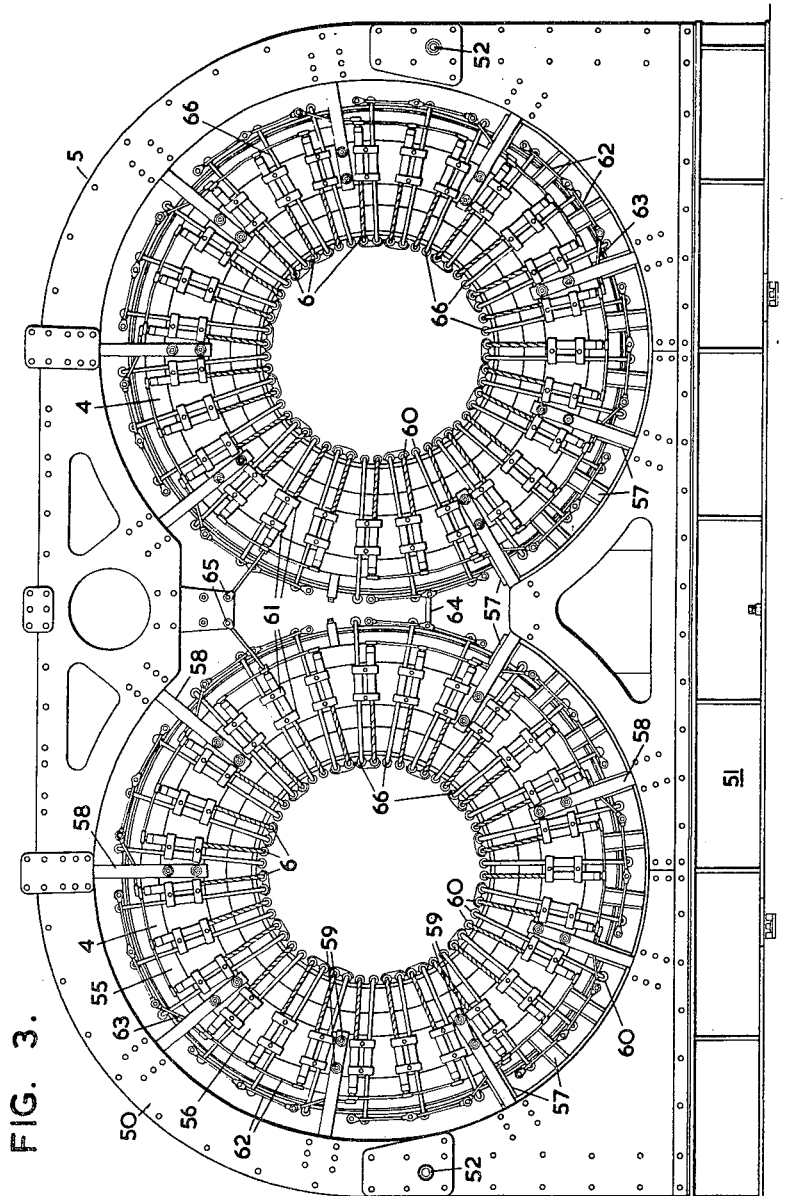
FIG. 3 is an elevation of the transformer assembly and supporting yoke.

Referring to FIGS. 1 to 3 a hollow metal torus T is constructed such that it can be split on a diameter into identical halves 1, each supported on a wheeled trolley 2. In FIG. 1 the nearer half is shown withdrawn from the further half, which latter is in its normal operating position. In FIG. 2 the halves 1 are shown brought together at flanges 3 to form the complete torus T. Transformer cores 4 are arranged to encircle the torus at the diametrically opposed positions occupied by the flanges 3, as shown in FIG. 2. The two cores 4 are supported within a substantial yoke structure 5 (FIG. 3) and the whole is housed within a massive concrete biological shield S. Detailed dimensions of the apparatus are given hereinafter, but for ease of understanding, it should be understood, at this stage, that the diameter of the continuous axis of the torus is of the order of 10 feet, a dimension which can be roughly assessed by the scale of the handrails H in FIG. 1.

Each transformer core 4 is provided with a heavy current distributed toroidal winding 6 of heavy section copper. The arrangement of each transformer winding 6 is such that the individual turns (shown cross hatched in FIG. 3) can be connected in a variety of series-parallel arrangements to constitute the primary winding of a pulse transformer having a single-turn short-circuited secondary winding provided by gas in the torus T. A substantially identical arrangement of individual turns 66 (not cross hatched) having their terminals on the opposite side of the transformer core constitutes a D.C. bias winding on each core.

Figure 9:
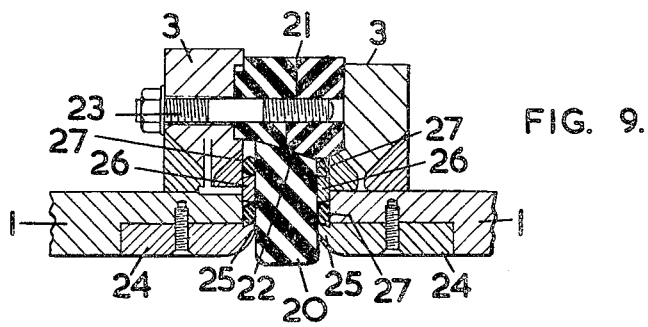
FIG. 9 is a cross-section through the seal provided between the two halves of the torus.

Electrical insulation 20, 21 is provided between the flanges 3 of the torus, as shown in FIG. 9, to prevent the metal torus itself from constituting a short circuited turn.

A toroidal stabilising winding 16 (FIG. 2) is arranged on the torus to provide an axial field which serves to reduce the inherent instabilities of the gas discharge to a level at which collisions with the walls are no longer significant. The winding 16 is housed in 11 formers 16a, 16b, and 16c on each quadrant of the torus. For the sake of clarity said formers have been omitted from the drawings except on one quadrant in FIG. 2.

The torus T, as can be seen from the plan view in FIG. 2, is fabricated from a plurality of short cylindrical sections so as to approximate to a true torus, and on a diameter at right angles to that containing the flanges 3, boxes 7 are provided. These boxes, as will hereinafter be described in greater detail, are fitted with windows 8 for the purpose of viewing the gas discharge within the torus.

Figure 4:
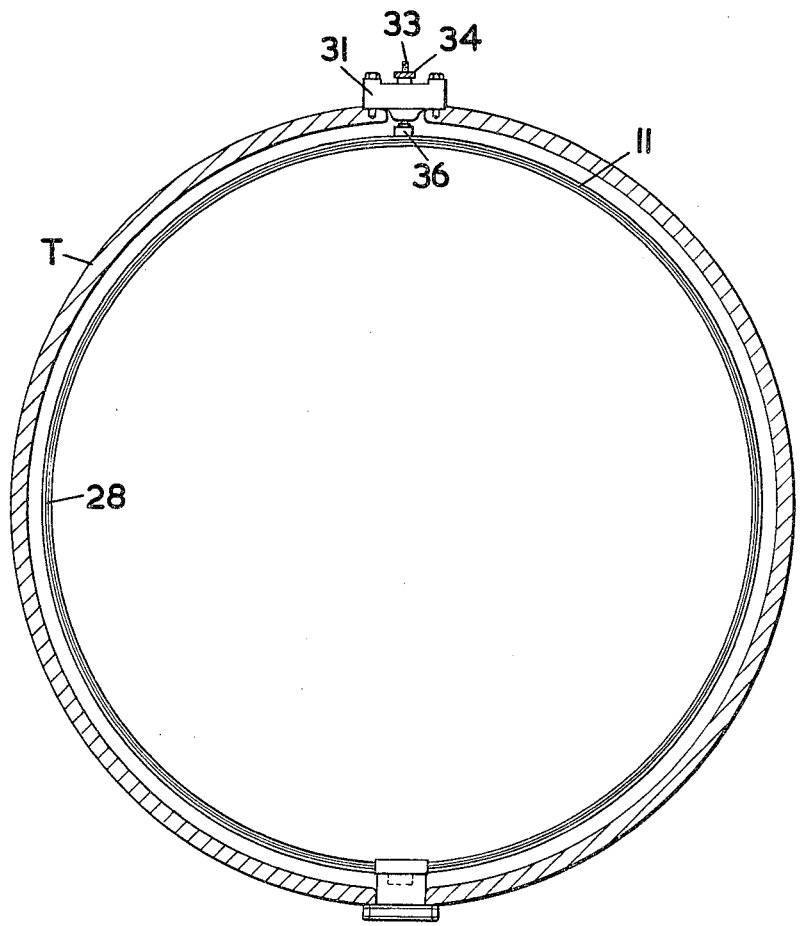
FIG. 4 is a cross-section to an enlarged scale through the torus showing an inner liner.
Figure 5:
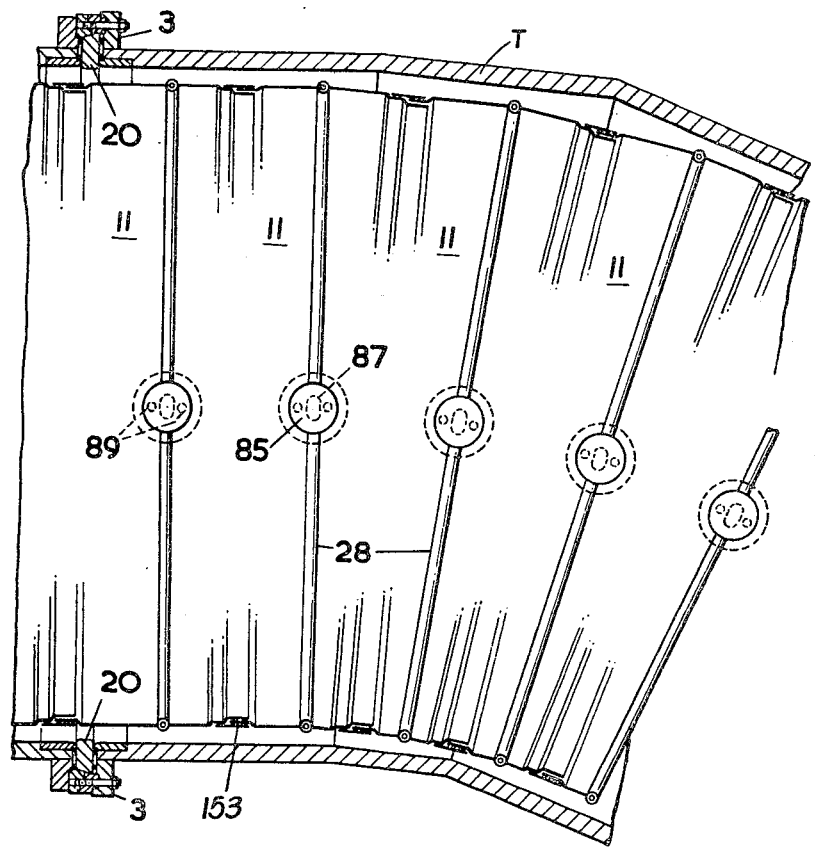
FIG. 5 is a cross-section on the continuous axis of the torus illustrating the arrangement of the inner liners.

Each half 1 of the torus T is provided with a lining at least in the region of each insulated gap to shield the gap from ion bombardment as hereinafter explained. It is preferred, however, to completely shield the torus by means of a liner comprising a series of segments 11 as shown in FIGS. 4 and 5. Each segment is independently supported top and bottom by electrically insulated and adjustable means illustrated in FIGS. 7 and 8 respectively, and, although each segment 11 overlaps its neighbor they are separated by an insulating seal. Thus, the potential difference which would be set up between the ends of a metallically continuous liner in each half torus 1 (by virtue of it being an open circuited secondary half-turn) is serially divided and only a comparatively small potential difference appears across each seal.

Means for evacuating the torus comprise manifolds 9 and pumps 10 (FIGS. 10 and 11) mounted on the undersides of the boxes 7 for evacuating the space within the liner, and pipes 156 and pumps 155 (FIGS. 1 and 2) connected to ports in the torus wall approximately halfway between the boxes 7 and the flanges 3 on each quadrant of the torus (only one of the four similar pairs of pumps is shown in the drawings) to further reduce the pressure in the space between the liner and the torus wall.

Referring now to the circuit diagram (FIG. 12) the principal components which have already been briefly described are the torus T, the transformer cores 4, the toroidal transformer windings 6, the toroidal stabilising windings 16 and the vacuum pumps 10 and 155 (one pump only is shown and the windings are purely diagrammatic).

The principal electrical components for generating recurrent high power pulses in the toroidal transformer windings 6 comprise a condenser 12, a high voltage D.C. supply 13 arranged to charge the condenser through a valve 14, and a mechanical switch 15 for discharging the condenser through a circuit including the windings 6, at the rate of about once every 10 seconds. The current in the windings 6 after each closure of the switch 15 thus takes the form of a single unidirectional pulse the length of which is determined by the time constants of the circuit and may be varied by altering the series/parallel arrangement of the winding 6. The distributed bias winding 66 is adapted to bias the transformer cores 4 to saturation in one direction, allowing a pulse to be applied to the winding 6 which will swing the flux to saturation in the opposite direction. The use of a biassed core enables and core area to be kept as low as possible and the core material is selected such that the bias power is kept to a minimum.

Having briefly described the whole apparatus, the various components will now be described separately in greater detail.

The torus T (FIGS. 1 and 2) is fabricated by welding together a plurality of short cylindrical commercial-grade aluminum sections so as to approximate to a true torus having a bore of 3 ft. 6 ins. and a mean diameter of 10 ft. 6 ins. giving a volume of about 10,000 litres. The wall thickness is about 1 in. in order to achieve the necessary electromagnetic image forces to stabilise the discharge. To prevent the metal torus itself constituting a short circuited turn at least one insulated gap must be provided, and to reduce the potential difference across each gap it would be desirable to construct the torus of a multiplicity of short sections mutually insulated. However to prevent upsetting the distribution of the eddy currents which produce the image forces it is an advantage to have the minimum number of gaps.

For practical reasons two gaps are provided between the flanges 3 and the method of providing an insulated vacuum tight seal is shown in detail in FIG. 9. No mechanical fastening is provided to hold the two halves 1 of the torus together, atmospheric pressure when the torus is evacuated being sufficient for the purpose. Each of the required gaps is filled by a washer 20 of polythene which is made captive on one of the flanges 3 by means of a composite insulating ring 21 of resin impregnated and bonded wood having a chamfered inner surface 22 which mates with a complementary outer surface of the washer 20. The composite ring 21 is made up of two layers of separate segments, with the joints in one layer staggered in relation to those in the other layer, and is secured to said flange 3 by studs 23. Annular aluminium inserts 24 provide undercut lips 25 which, together with dovetail section rings 26, locate two rubber O-rings 27 against the face of each flange 3. The thickness of the dovetail rings 26 is such that when the flanges 3 are forced together the O-rings 27 are compressed just sufficiently to effect a vacuum seal between each flange and the washer 20. The inserts 24 are arranged to be readily replaceable should they become damaged by breakdown across the gap between them.

The cylindrical segments 11 which form a liner for the torus are provided to shield the two gaps, filled by the washers 20, from the ion bombardment and ultraviolet radiation which would otherwise result in breakdown of the gaps under the operating conditions hereinafter described. There are 48 segments 11 and thus the potential across the gaps between each segment is $\frac{1}{24}$ of that across the gaps in the torus and electrical breakdown is unlikely under said operating conditions.

Figure 6:
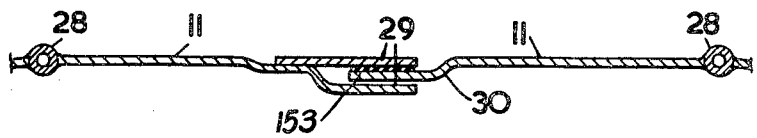
FIG. 6 is a section to a yet larger scale showing the details of the inner liner.

Each segment 11 comprises a pipe loop 28 (FIGS. 5–8) to each side of which a cylindrical sleeve is welded as shown in FIG. 6, the axes of the sleeves being at a small angle to each other to conform to the shape of the torus. The outer edge of one sleeve is bifurcated as shown at 29 and that of the other is offset as shown at 30 so that edges of adjacent segments are interleaved and the walls of the torus T are completely screened. In order to ensure that adjacent liner segments do not touch, and to provide a partial vacuum seal between the space within the liner and the annular space between the liner and the torus wall, insulating gaskets 153 of polytetrafluoroethylene are fitted between each pair of adjacent segments.

Figure 7:
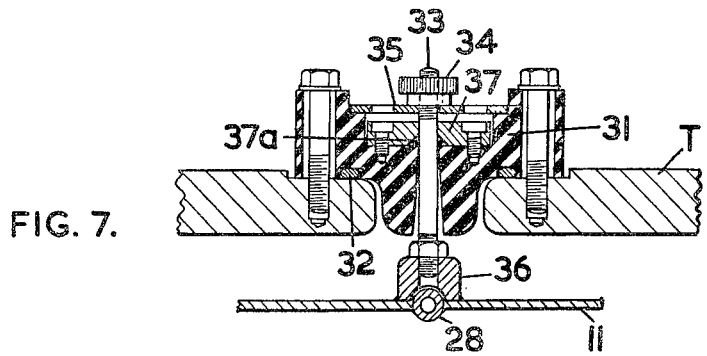
FIG. 7 is a section through the upper support means for one of the inner liners.
Figure 8:
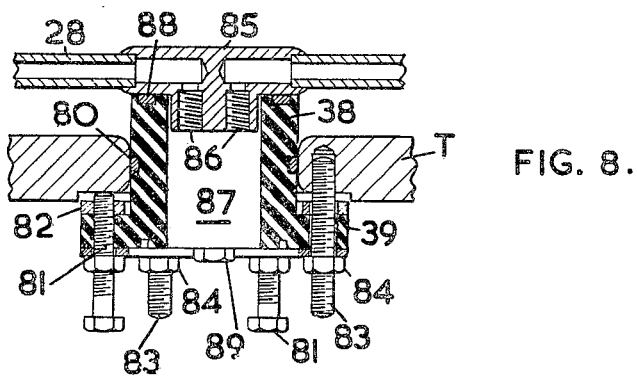
FIG. 8 is a cross-section showing the lower locating means for an inner liner.

To adjust the positions of the segments 11 upper and lower adjustable, electrically insulated and vacuum tight supports are provided as shown in FIGS. 7 and 8 respectively. Referring to FIGS. 4 and 7 each upper support comprises a bushing 31 of insulating material adapted to be bolted over a hole in the wall of the torus T and provided with a vacuum seal 32. A bolt 33 supported by a knurled nut 34 which engages a plate 35 is screwed into a boss 36 welded to the top of the liner segment 11 where the pipe loop 28 is situated.

The bore in the bushing 31 through which the bolt 33 passes is flared to ensure that the bolt hangs vertically and a vacuum seal between the bolt and the bushing is effected by means of a plate 37 and O-ring seal 37a. The liner segment 11 may thus be adjusted vertically by means of the knurled nut 34. Horizontal adjustment is afforded by providing a large clearance between the bushing 31 and the bolts which secure it to the torus T.

Referring to FIG. 8, each lower support comprises a barrel-shaped bushing 38 of insulating material having a circular flange 39. The bushing 38 is provided with a vacuum seal 80 where it passes through a hole in the wall of the torus T and is vertically aligned by means of three set-screws 81 equally spaced around the flange 39 and threaded into a metal thrust plate 82 and by means of three studs 83 alternated with the screws 81 around the flange 39 and threaded into the torus T. The studs 83 are a loose fit in the flange 39 and plate 82 and are provided with nuts 84. Thus the ends of the set screws 81 are held against the torus by the nuts 84 on the studs 83 and the vertical position and alignment of the bushing 38 can be adjusted by the set-screw 81.

A disc-shaped pipe-fitting 85 (see also FIG. 5) is secured to the bottom centre of each liner segment 11 and receives the ends of the pipe loop 28. Two threaded sockets 86 depend from the fitting 85 into an oval-section bore 87 in the bushing 38 so that pipe connections for a cooling fluid may be made to the pipe loop 28. A sealing ring 88 is provided between the pipe fitting 85 and the bushing 38 and two bolts 89, which pass through the thick parts of the wall of the bush 38 secure the said fitting to the said bushing.

Details of the window boxes 7 and associated pumps are shown in FIGS. 10 and 11. Each consists of an aluminum forging arranged to be secured between flanges 40 on adjoining sections of the torus T. Slit-like glass windows 8 are provided at the front and top faces of the box 7 and a cylindrical manifold 9 is secured at the underside thereof, an electrical insulating plate 41 being interposed. Along the bottom of the manifold 9 is a further window 42 in alignment with the upper window 8. The manifold 9 connects to a T-piece 43 (see also FIG. 1) on each limb of which a 14 in. bore diffusion pump 10 is mounted. The eight pumps 155 (see FIGURE 2) are of 6 in. bore and are connected by pipes 156 and flanged joints 158 to short lengths of pipe 157 which are connected by flanged joints to holes in the torus wall. The flanged joints 158 are provided with polythene gaskets (not shown) to maintain the insulation of the torus. Similar insulation is provided on the various other gas and liquid connections made to the torus and liner system. All twelve pumps are connected to a common backing line.

Oil diffusion pumps may be used in a system operating with deuterium, the pump oil being allowed to become saturated with deuterium. In a system using tritium mercury pumps are preferably used, adequate known precautions such as ensuring low back diffusion and efficient cold trapping being taken to prevent back diffusion of mercury into the aluminium torus.

FIG. 11 also shows how the liners 11 adjacent to the window boxes meet the side walls 165 of the window boxes in partial vacuum seals provided by annular grooves 164 formed on the outer faces of these walls. Insulating material 153 is provided between the liners and the grooves in a manner similar to that between adjacent liners.

As shown in FIGS. 1 and 3 the transformer cores 4 are ring shaped and supported within a yoke structure 5 comprising two similar end members 50, fabricated from steel plate and channel, each as shown in elevation in FIG. 3. The members 50 are mounted on a base 51 formed of steel channels and are connected by a number of lateral tie bolts 52.

Each core 4 consists of a number of annular plate-like elements 53 (see FIG. 2) each made from spirally wound cold reduced transformer steel strip 47 held between inner and outer steel hoops 48 and 49 respectively. There are twelve full size elements 53 to each core, each element having an internal diameter of 60 in., an external diameter of 120 in., and a thickness of 4 in. At each end there are three graded size elements 54 together with large and small annular plates 55 and 56 respectively made of resin impregnated and bonded wood.

Each core rests on ten bearers 57 extending between the end members 50 of the yoke structure 5 and is held at each end by eight radial arms 58 extending radially inwardly from the end member 50 and each secured to the outer insulating plate 56 by two bolts 59. No tie bolts extend through the core, the elements 53 being held together by end pressure exerted by the structure 5 via arms 58.

The winding on each core consists of 54 single loop turns (FIG. 2) each about 18 ft. long of rubber insulated cable nominally rated at 11 kv. of approximately 1.13 in. outside diameter, which extend through the insulating tubes 60 and are supported by clamps 61 attached to the outer insulating plates 56. The 27 exciting windings 6 to which the pulse is applied are shown cross hatched and are connected in groups of three connected at their ends by links 62. One end of each group is connected to the other end of the next group by a link 63, thus providing in effect nine turns on each core which are connected in series by a link 64 to give a total of eighteen turns between terminals 65. The twenty-seven bias windings 66 have their connections on the opposite face of the core and are connected to form three groups of nine parallel-connected windings, the three groups being connected in series. The bias windings on the two cores are also connected in series to give six series-connected turns. The ends of the exciting and bias windings are finally brought out to terminals 67 (FIG. 1).

The stabilising windings 16 on the torus T are shown only in FIG. 2 and there only on one quadrant for the sake of clarity. On each quadrant the winding is housed in nine formers 16b, one former 16a, adjacent to the flanges 3 and one former 16c adjacent to the window box 7. The formers 16b each contain three layers of five turns whereas the former 16a contains four layers of five turns and the former 16c six layers of four turns, the additional turns on the end formers of each quadrant compensating for the increased spacing of the end formers necessitated by the flanges 3 and boxes 7 to give a substantially constant magnetic field along the continuous axis of the torus. The complete winding 16 thus consists of 716 series-connected turns and at a current rating of 1200 amps. gives a field of approximately 1000 gauss. The windings 16 are fed from a conventional D.C. supply 17.

Referring now to the circuit diagram (FIG. 12), the power supply 13 is a conventional 27 kv. D.C. power supply comprising a three-phase transformer and rectifier. The condenser 12 is of 1600 μf. capacity capable of being charged to 25 kv., and comprises fifty-two mineral-oil impregnated paper-insulated capacitors each of 31 μf. connected in parallel. Charging is effected linearly through a limiting resistance 100 of about 20 ohms and the triode valve 14 (Orsam Type E1872) which latter is provided with a filament transformer 101 and filament supply 102. The potential supply 103 for the grid of triode 14, which is operated under emission-limited conditions giving a sensibly constant charging current of 4–5 amps., is controlled by a motor-driven master timing unit 104.

The condenser 12 is discharged through the windings 6 by the switch 15 which is a high-speed closing switch having both contacts insulated for a working voltage of 25 kv. and capable of closing 90 kiloamperes with a pre-arcing time of less than 500 microseconds. The switch is of the compressed-air operated type, and is pressurized with air to 150 lbs./sq. in. to reduce sparking between the contacts as they close. Contact wear is minimised by the provision of a large saturable reactor 105 biased from a D.C. supply 106 through an isolating choke 107. The reactor 105 is designed to absorb 25 kv. during the pre-arcing time without the current rising to more than 1000 amperes. The inductance, when saturated, is low enough to affect appreciably the peak value of the pulse current. To give a step-down turns ratio of 9:1 between the primary winding and the single-turn secondary constituted by the ring discharge, the inductance of the reactor 105 is required to be less than 100 μh. A resistor 162 of about 100 ohms is connected across the reactor 105 to allow a current of up to about 200 amps. to flow through the windings 6 during the pre-arcing time.

Also in the main pulse circuit, in series with the saturable reactor 105, is a non-linear resistance 109. The non-linear resistance 109 consists of a bank of 300 Metrosil (regd. trademark) units connected in parallel to reduce the reverse voltage on overswing in the pulse circuit to less than 10% of the maximum forward voltage and so protect the condenser 12. As a further protective measure there is connected across the windings 6 an ignitron 163 (B.T.H. Type BK 178) which is triggered by a pulse from a control circuit 166 when the voltage across a potentiometer 118 starts to reverse.

The current in the gas discharge in the torus T is monitored by a two-turn toroidal Rogowsk pickup coil 110 wound round the outside of the torus. In the event of the gas current failing to rise within about 0.5 millisecond after closure of the switch 15 the output from the coil 110 is used to trip a control circuit 112 of an ignitron 113 (B.T.H. Type BK 178) so as to fire the ignitron and short-circuit the windings 6 through a 2 ohm resistance bank 114. The pulse which fires the ignitron 113 is generated in the circuit 112 from the back edge of a pulse obtained from a winding 159 on the reactor 105, this firing pulse being normally inhibited by the pulse obtained from coil 110.

Other monitoring devices include an oscilloscope 117 operated from a tapping on the potentiometer 118 to indicate the condenser voltage, an oscilloscope 119 operated from an inductive coupling 120 in the pulse circuit to indicate the primary pulse current and an oscilloscope 121 operated from a tapping on a potential divider 122 connected across a winding on one of the cores to indicate the voltage across the said windings. An oscilloscope 123 is also connected to the gas current monitoring coil 110 to indicate the gas current in the torus. The time-bases for these oscilloscopes are triggered via a lead 161 from a timing circuit 160 which is triggered from the winding 159. Two time-base speeds are available. Two Hughes "Memotron" storage oscilloscopes (not shown) can be switched to inspect wave forms at selected points in the circuit.

The gas in the torus T is ionised prior to the main discharge by applying an R.F. voltage from a source 126 between two liner segments 125 spaced approximately halfway round two adjacent quadrants of the torus. The R.F. frequency is about 3 mc./s., and the voltage adjusted between 500 and 1000 v. to give a current of about 5 amps. This R.F. voltage is applied continuously except during the main pulse, when it is turned off by a signal from the timing circuit 160 in order to avoid interference with the various measuring instruments.

The bias windings 66 are provided with D.C. from a three-phase transformer and rectifier supply 127 to which they are connected through a choke 128 to isolate the supply from the pulse voltage induced in the bias winding.

A safety switch 129 is provided for the protection of personnel to discharge and earth the condenser 12 through the resistance 114 before any maintenance operations are carried out on high voltage parts of the apparatus.

Figure 12:
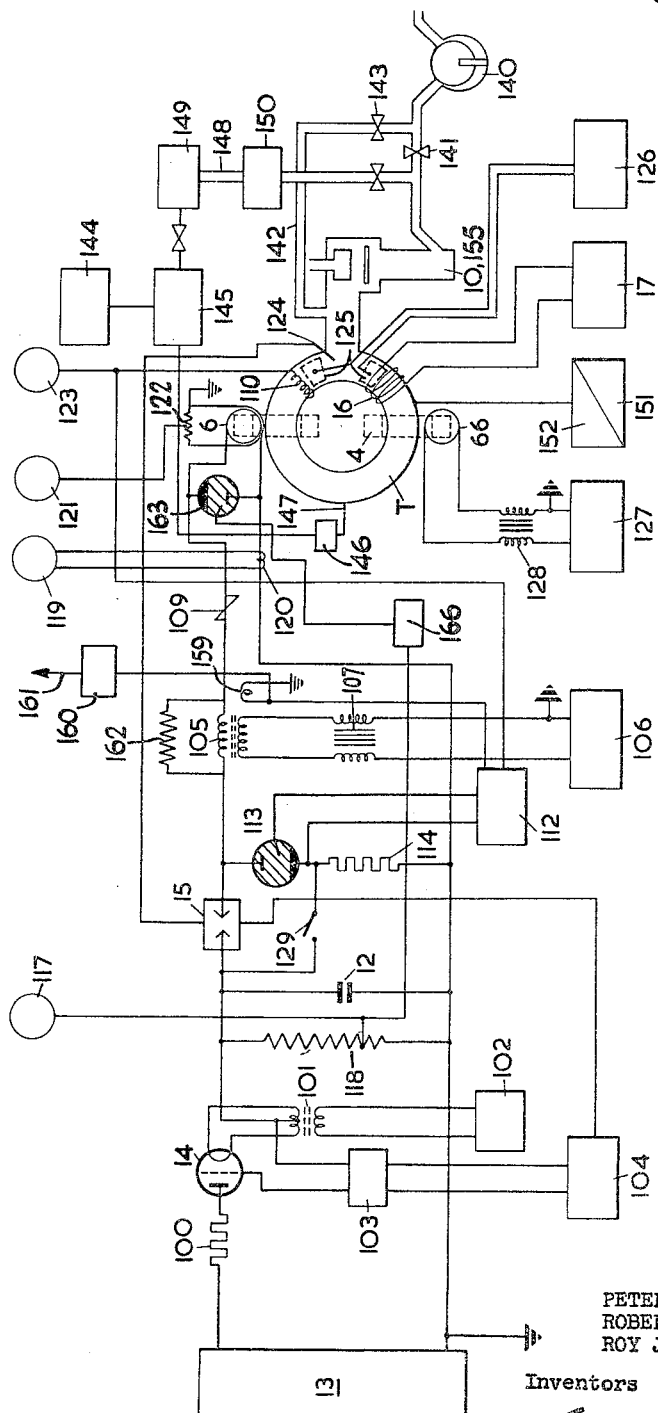
FIG. 12 is a diagram showing the essential electrical and gas circuits of the apparatus.

FIG. 12 also shows the vacuum plant and the gas supply system both of which consist of arrangements of conventional pumps and valves. The vacuum system comprises the four diffusion pumps 10 and the eight pumps 155 (see also FIG. 1) backed by a common rotary vane pump 140 (Kinney Type DVD 8810) which can be isolated by a valve 141 and, for initial pumping, can be connected directly to the torus T through a by-pass 142 controlled by a valve 143. The gas supply comprises a cylinder or cylinders 144 of deuterium or tritium supplying at a pressure of two atmospheres a reservoir 145 which is connected to one of the window boxes 7 through a hot nickel tube gas leak 146 and a pipe connection 147.

The vacuum system provides for an initial pump-out speed of about 5,000 litres per second down to a residual gas pressure of less than $5 \times 10^{-6}$ mm. Hg. An operating gas pressure of between $10^{-4}$ and $10^{-3}$ mm. Hg within the liner, after admission of deuterium and/or tritium through the leak 146, is maintained with a pumping speed of about 8300 litres per second. The annular space between the liner and the torus wall is reduced to a lower pressure by the pumps 155 in order to further reduce the risk of breakdown at the gaps between the flanges 3. The system may be isolated by the valve 141 from the roughing pump 140 and supply 144 and operated as a closed circuit. Gas from the high pressure side of the diffusion pumps 10 is fed via a trap 150 through pipe 148 to a booster pump 149 comprising a mercury vapour diffusion pump and a Toepler pump in series, which raises the pressure to 2 atmospheres and feeds the gas back into the reservoir 145. The trap 150 is provided in the pipe 148 to remove any impurities.

The cooling water supply to the pipe loops 28 of the inner liners 11 (FIGS. 5–8) is operated as a closed system by a pump 151 and heat exchanger 152 and the heat extracted may be put to any useful purpose.

To detect emitted neutrons eight $BF_3$ neutron counters and eight indium-walled Geiger counters, surrounded by paraffin wax to act as a moderator, are mounted adjacent to one quadrant of the torus. A plastic phosphor scintillation counter is also suspended over the torus to measure fast neutrons and gamma rays. None of these conventional particle detectors is shown in the drawings.

In the operation of the apparatus the torus T is firstly roughly evacuated by the pumps 140 with valve 141 shut and valve 143 open. The condition of these two valves is then reversed and the diffusion pumps are operated to reduce the pressure in the torus to less than $5 \times 10^{-6}$ mm. Hg. According to the type of experiment being studied, deuterium and/or tritium from the cylinders 144 is then admitted to the torus through the nickel tube leak 146 at a rate such that a steady pressure of from $10^{-4}$ to $10^{-3}$ mm. Hg is maintained within the liner.

With cooling water pump 151 operating, R.F. power applied between the segments 125, and the bias windings 66 and stabilising windings 16 suitably energised, a pulse discharge is then initiated in the torus T under the control of the master timer 104.

Let it be assumed that the transformer primary windings 6 are each connected as shown to provide a 9:1 turns ratio between them and the single-turn secondary constituted by the gas in the torus T. So connected the circuit comprising also the condenser 12, saturable reactor 105 and non-linear resistance 109 has a total inductance of 1 mh. of which the transformer leakage inductance forms about half. The natural frequency of the circuit is about 123 c.p.s. and when the condenser 12 is suddenly discharged into the circuit by closing the switch 15, a current pulse which reaches a peak value of approximately 20 ka. in 1.5 milliseconds passes through the winding 6 inducing a current pulse of substantially nine times the magnitude in the ionised gas in the torus. The ignitron 163 fires as the voltage on the condenser 12 starts to reverse, and the primary and gas currents die away exponentially. The load resistance of the gas (the single-turn secondary winding) is about 0.001 ohm. and the peak gas current is at least 180 ka., exceeding 80 ka. for 3 milliseconds.

The ions are largely heated as a result of collisions they make with the electrons and a finite time is required for the ions and electrons to come into thermal equilibrium. Under the conditions of the present embodiment this time is estimated to be of the order of 1 millisecond. For this reason the circuit exciting the discharge is designed to deliver a current pulse having a duration of at least 1 millisecond.

The current which is permitted by the resistor 162 to flow through the windings 6 during the 500 microsecond pre-arcing time serves to preheat the gas in the torus and increase its degree of ionisation before the application of the main pulse.

The closure of the switch 15 is arranged under the control of master timer 104 to be recurrent up to a maximum rate of one pulse every 10 seconds, the switch remaining closed for about 1 second until the current has fallen sensibly to zero. Alternatively single discharges can be initiated manually.

The transformer cores 4 are biassed by the windings 66 to 17,000 gauss and the pulse produces a peak to peak swing in flux density of 34,000 gauss. By this means the core area is kept to a minimum and is, in fact, only 3700 sq. ins.

The apparatus may be operated under high peak power conditions by reducing the effective number of turns of the primary winding 6 i.e. by connecting more of the turns in parallel. The effect is to raise the natural frequency of the circuit and reduce the duration of the pulse. A three-turn primary on each core gives a natural frequency of 900 c.p.s. and a peak primary current of 90 kiloamperes.

Neutrons have been produced in the apparatus above described under the following conditions:

(*a*) Deuterium pressure: 0.125 micron Hg.

(*b*) Ion temperature: approximately $5 \times 10^{60}$ K. (as measured by Doppler broadening).

(*c*) Peak gas discharge current: 180 ka.

(*d*) Applied D.C. axial stabilising field: 160 gauss.

(*e*) Pulse length: 3 milliseconds (with gas current greater than 80 ka.).

(*f*) Condenser voltage: 20 kv.

(*g*) Transformer ratio: 9:1.

We claim:

1. Gas discharge apparatus comprising a toroidal vessel for containing the gas, said vessel having thick electrically conducting walls with at least one electrically insulating joint transverse to the continuous axis of the vessel, pulse transformer means coupled to said vessel for establishing a pinched high-current unidirectional pulsed ring discharge in the gas, and means including a toroidal winding on the outside of the vessel for setting up a magnetic field within the vessel parallel to the continuous axis thereof for reducing spatial instabilities of the discharge channel.

2. Apparatus as claimed in claim 1 wherein the vessel is provided with a toroidal liner arranged within and adjacent the wall of said vessel to shield the insulating joint from the discharge.

3. Apparatus as claimed in claim 2 wherein the liner comprises a plurality of metallic substantially cylindrical segments insulated from the vessel and from one another.

4. Apparatus as claimed in claim 1 wherein the pulse transformer means comprises at least one ring transformer core linked with the vessel.

5. Apparatus as claimed in claim 4 wherein the primary winding of the transformer is a winding on the core.

6. Apparatus as claimed in claim 4 wherein the transformer has a direct current bias winding.

7. Apparatus as claimed in claim 1 wherein the transformer primary winding is energised by a circuit comprising a condenser chargeable from a voltage source and dischargeable through the winding.

8. Apparatus as claimed in claim 7 wherein the condenser is dischargeable through a switch in series with a saturable reactor.

9. Apparatus as claimed in claim 8 wherein said reactor is shunted by a resistor to enable the gas to be preheated before the pulse is applied.

10. Apparatus as claimed in claim 1 wherein radio-frequency energy is injected into the vessel prior to the application of the main pulse to promote ionisation.

11. Apparatus as claimed in claim 3 wherein radio-frequency energy is injected into the vessel between two liner segments prior to the application of the main pulse to promote ionisation.

References Cited in the file of this patent

UNITED STATES PATENTS

| | | |
|---|---|---|
| 2,330,849 | Smith | Oct. 5, 1943 |
| 2,790,902 | Wright | Apr. 30, 1957 |
| 2,910,414 | Spitzer | Oct. 27, 1959 |

FOREIGN PATENTS

| | | |
|---|---|---|
| 706,036 | Great Britain | Mar. 24, 1954 |

OTHER REFERENCES

Review of Modern Physics, vol. 28, No. 3, July 1956, an article by R. F. Post, pp. 338–342, 344, 345, 346, 347, 359, 360, 361, 362.

J. of Applied Physics, vol. 28, No. 5, May 1957, pp. 519–521.

Physical Society of London, Proceedings, vol. 64B (1951), S. W. Cousins and A. A. Ware, pp. 159–166.

Proceedings of the Second United Nations International Conference on the Peaceful Uses of Atomic Energy, vol. 31, United Nations, Geneva (1958), pp. 37, 38.

Atomic Industry Reporter, News and Analysis, Official Text, Section 1958, Library No. TK 9001 A7, issue of Jan. 29, 1958, pp. 54:5–54:11.

Science, Aug. 15, 1958, pp. 337–343.